J. D. MEREDITH.
LIQUID MEASURING DEVICE.
APPLICATION FILED AUG. 7, 1917. RENEWED APR. 16, 1920.
1,341,189.
Patented May 25, 1920.
4 SHEETS—SHEET 2.
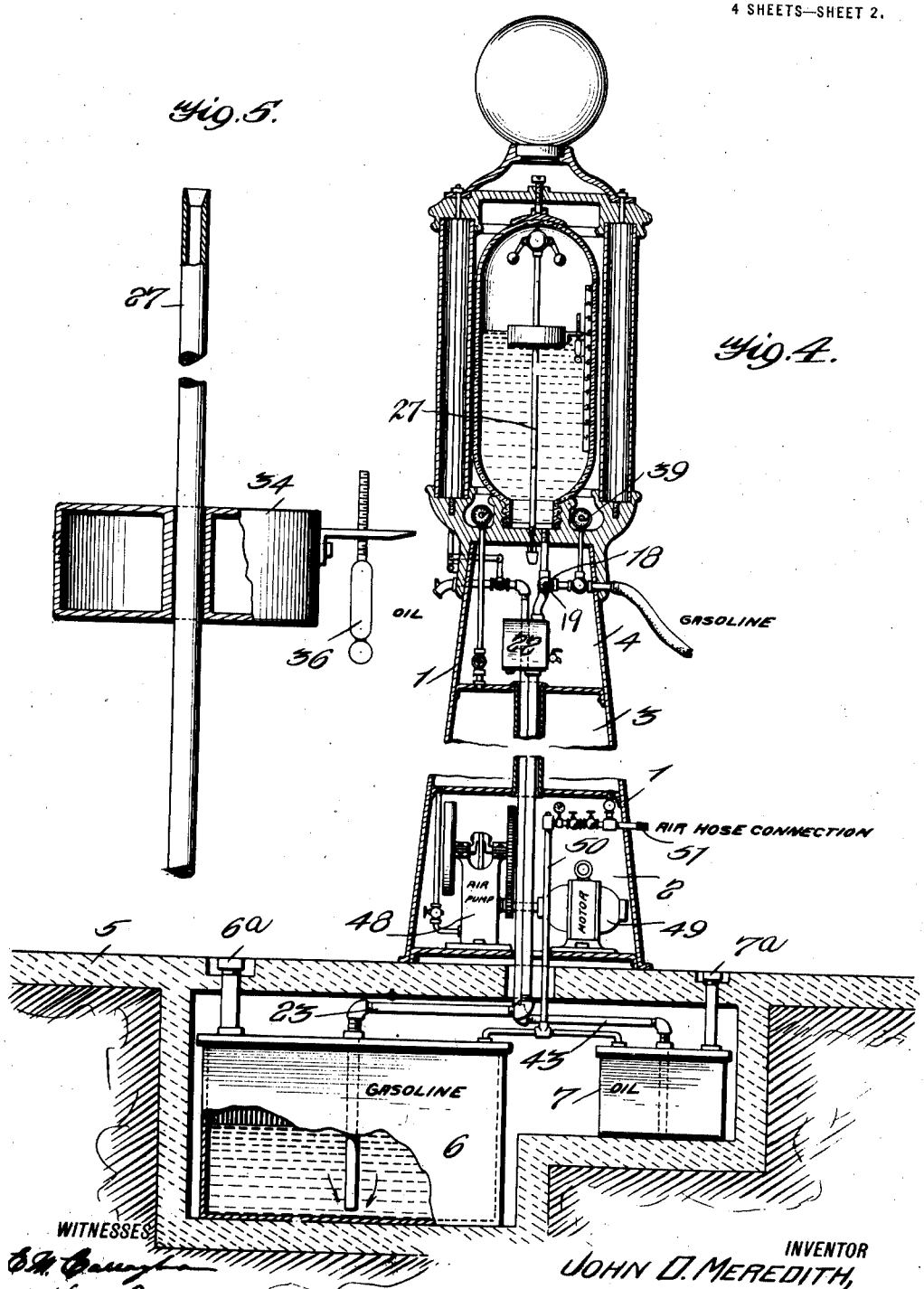
INVENTOR
JOHN D. MEREDITH,
BY
ATTORNEYS J. D. MEREDITH.
LIQUID MEASURING DEVICE.
APPLICATION FILED AUG. 7, 1917. RENEWED APR. 16, 1920.

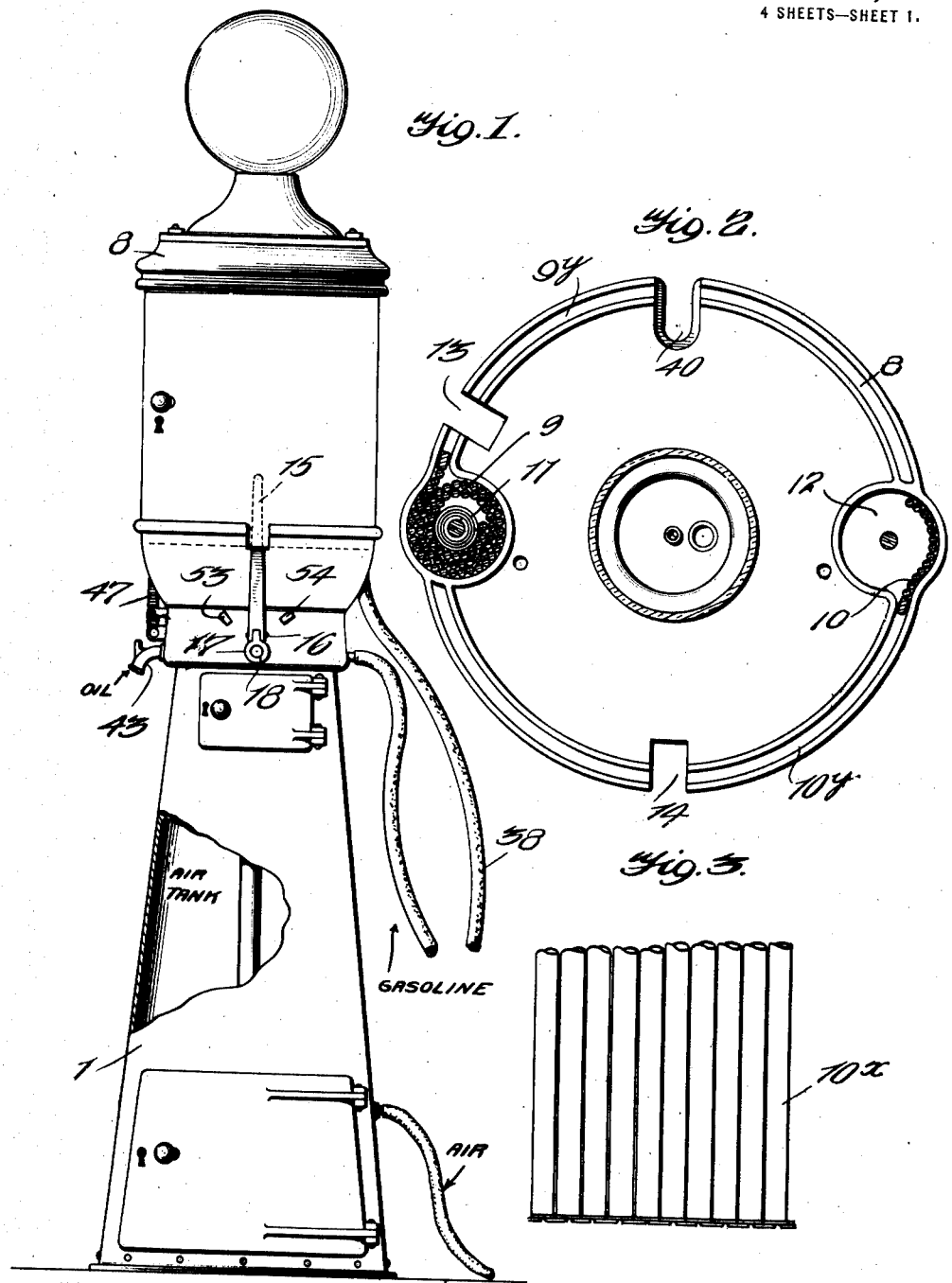

1,341,189.

Patented May 25, 1920.
4 SHEETS—SHEET 3.

WITNESSES

INVENTOR
JOHN D. MEREDITH,
BY
ATTORNEYS

J. D. MEREDITH.
LIQUID MEASURING DEVICE.
APPLICATION FILED AUG. 7, 1917. RENEWED APR. 16, 1920.

1,341,189.

Patented May 25, 1920.
4 SHEETS—SHEET 4.

WITNESSES

INVENTOR
JOHN D. MEREDITH,
BY
ATTORNEYS

UNITED STATES PATENT OFFICE.

JOHN DEWITT MEREDITH, OF WICHITA FALLS, TEXAS.

LIQUID-MEASURING DEVICE.

1,341,189.   Specification of Letters Patent.   Patented May 25, 1920.

Application filed August 7, 1917, Serial No. 184,848. Renewed April 16, 1920. Serial No. 374,490.

*To all whom it may concern:*

Be it known that I, JOHN D. MEREDITH, a citizen of the United States, and a resident of Wichita Falls, in the county of Wichita and State of Texas, have invented a new and useful Improvement in Liquid-Measuring Devices, of which the following is a specification.

My invention relates to liquid measuring devices, more particularly those for dispensing gasolene, oil and the like, and it consists in the combinations, constructions and arrangements herein described and claimed.

An object of my invention is to provide a device of the type mentioned which will actually indicate both to the buyer and seller the amount of liquid dispensed, as for instance, the amount of gasolene which is delivered from the device into the tank of an automobile.

A further object of my invention is to provide a device which will permit the buyer to see the condition of the gasolene before it is delivered from the machine. To this end, I make use of a glass vessel into which the gasolene is run prior to its delivery from the machine.

Other objects and advantages will appear in the following specification and the novel features of the invention will be particularly pointed out in the appended claims.

Figure 6:
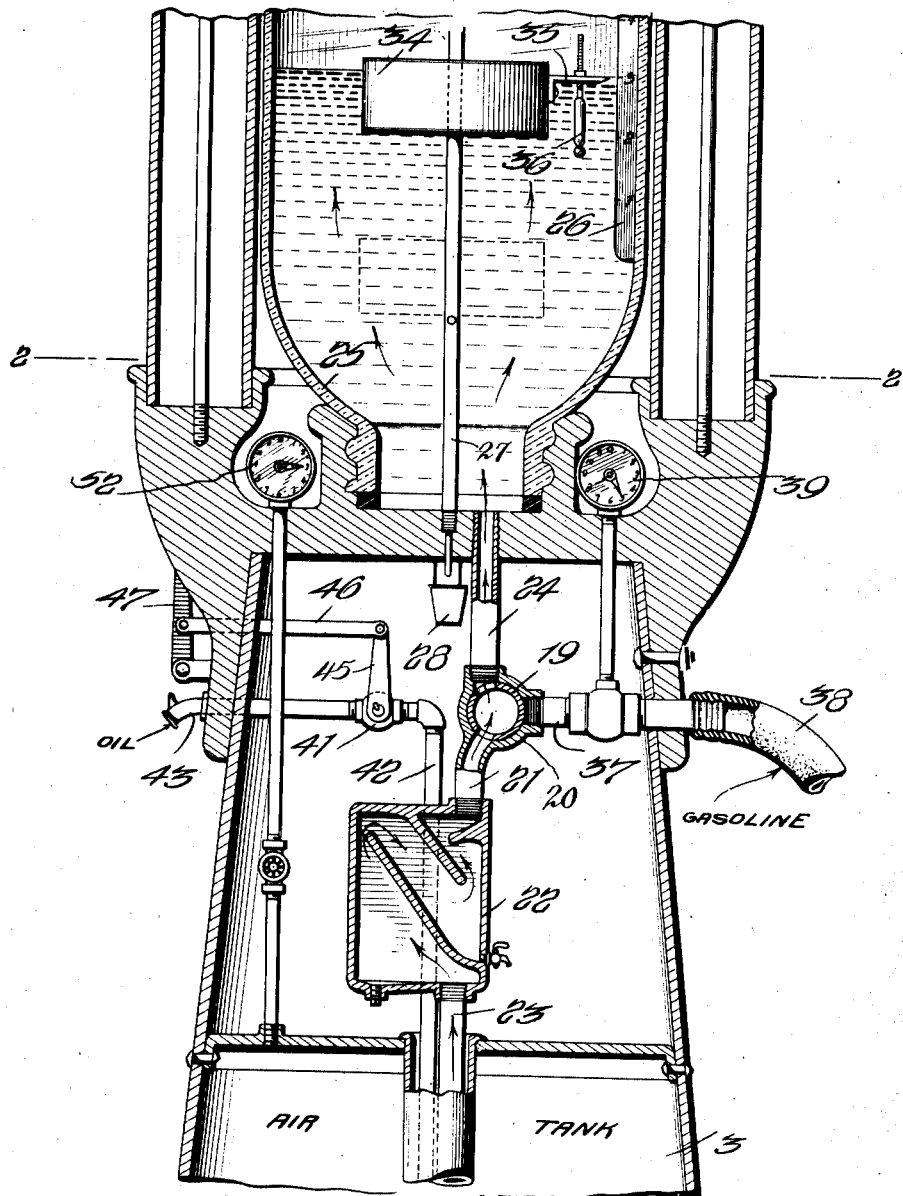
Figure 7:
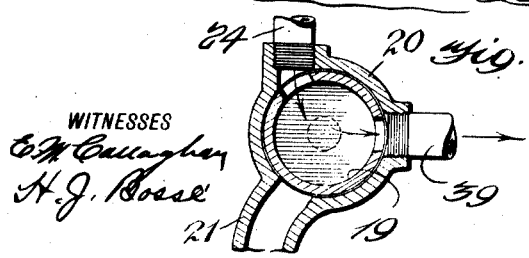
Figure 8:
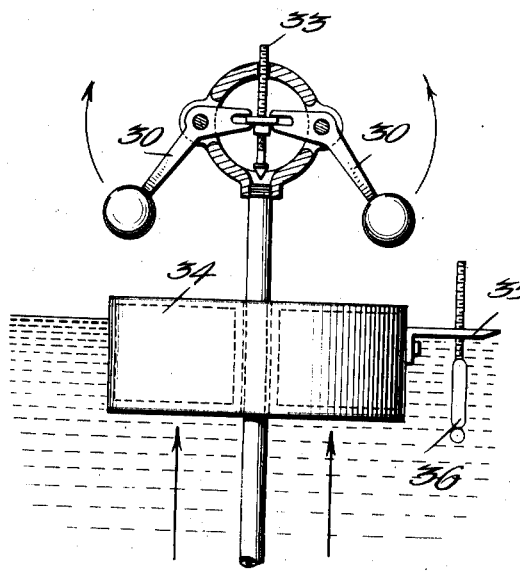
Figure 10:
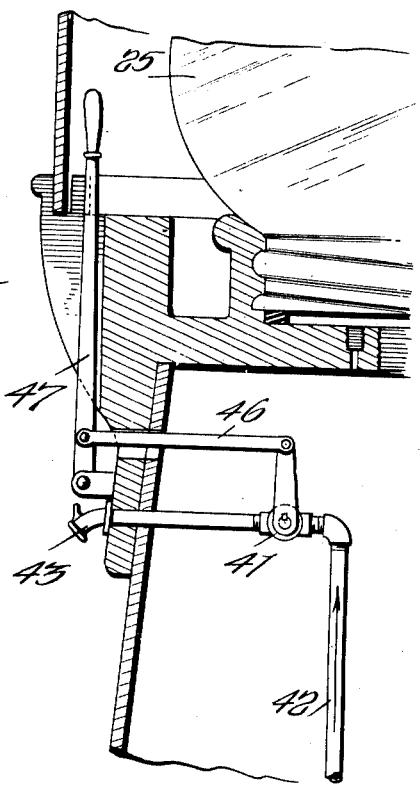
Figure 9:
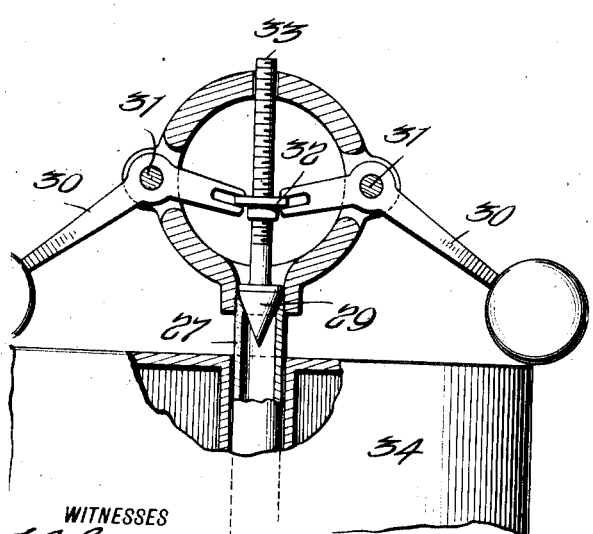
Figure 11:
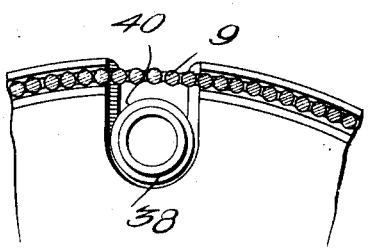

My invention is illustrated in the accompanying drawings, forming part of this application, in which, Figure 1 is a side view showing one embodiment of my invention, Fig. 2 is a sectional view on the line 2—2 of Fig. 6, Fig. 3 is a detail view showing the construction of one of the roller doors, Fig. 4 is a vertical section through the device, Fig. 5 is a detail view of a float and hydrometer, Fig. 6 is an enlarged section of a portion of the apparatus shown in Fig. 4, Fig. 7 is an enlarged sectional view through a three-way valve shown in Fig. 6, Fig. 8 is a view of the float operated check valve showing the valve open, Fig. 9 is an enlarged view showing the valve closed, Fig. 10 is a sectional view showing the means for operating the oil valve, Fig. 11 is a section through a portion of the door and casing.

In carrying out my invention I provide a base portion 1 which is really a hollow casing divided off into compartments 2, 3 and 4. This base is mounted preferably on a platform 5, see Fig. 4, beneath which are the tanks 6 and 7, the former being the gasolene tank and the latter the oil tank. Filling pipes $6^a$ and $7^a$ respectively extend upwardly.

Carried at the top of the base 1 is a casing 8 which is provided with a pair of "roller" doors 9 and 10 respectively, these doors being made up of a plurality of strips, such as those shown at $10^x$ in Fig. 3. Each door is adapted to be shoved backward in a guide slot such as those shown at $9^y$ and $10^y$ in Fig. 2 and to be rolled up under the tension of a spiral spring in the chambers 11 and 12 respectively. One of these doors is designed to be opened to permit access to the gasolene valve lever and the other to permit access to the oil valve lever. As will be seen from Fig. 2 the outer edge of the casing has a slot 13, while a slot 14 is on the opposite side of the casing.

Arranged to enter the slot 14 is a lever 15 which is pivoted at 16 on a collar 17 arranged on a shaft 18. The latter extends inwardly through the casing and connects at its end with a three-way valve 19 which is disposed within a valve casing 20.

A pipe 21 leads from this valve casing, see Fig. 6, into the interior of a sediment trap 22 which in turn communicates by means of a pipe 23 with the gasolene tank 6. A pipe 24 also communicates with the valve casing 19 and leads upwardly communicating with the interior of a glass receptacle 25. The latter contains a scale 26 on its interior calibrated preferably in gallons. Disposed centrally of the receptacle 25 is a tube 27, the lower end of which communicates with the chamber 4, a drip cup 28 being provided. The pipe 27 serves as an air vent. The upper end of the tube is provided with a valve 29 which is arranged to seat in the end of the tube 27, being operated by means of a pair of bell-crank-levers 30 which are pivoted at 31, and whose ends engage a nut 32 on the threaded stem 33 of the valve. Surrounding the tube 27 is a float 34 which has an arm 35 having an opening through which the stem of a hydrometer 36 extends.

Referring again to Fig. 6, it will be seen that a pipe 37 connects the three-way valve with a gasolene hose 38, a gasolene gage 39 of any suitable type being disposed in connection with this pipe for measuring the quantity of gasolene delivered. The outer end of this hose 38 is arranged to enter a slot 40 in the casing and to be covered by the door 9.

Again referring to Fig. 6, it will be seen that a valve 41 controls a pipe 42 which has an outlet 43 on the exterior of the casing and which communicates with the oil tank 7. The valve 41 has a lever arm 45 which is connected by a link 46, see Fig. 6, with a lever 47 which is arranged to enter the slot 13, as before stated.

The chamber 3 is designed to receive compressed air from the air pump 48. The latter is driven by the motor 49. Air from the chamber 3 is delivered to the tanks 6 and 7 by means of a pipe 50 while an air hose connection 51, see Fig. 4, is provided for filling the tires. The air chamber 3 is provided with a pressure gage 52.

From the foregoing description of the various parts of the device, the operation thereof may be readily understood.

Let us assume that the customer wishes five gallons of gasolene. The doors are unlocked and are shoved back, being assisted, as stated before, by the springs in the chambers 11 and 12. The glass receptacle 25 is now in full view. The lever 15 is swung outwardly on its pivot 16 until it clears the casing, and then the valve handle is turned first to the left until it strikes the stop 53. This brings the valve 19 into the position shown in Fig. 6 and permits gasolene under pressure to flow through the pipe 23, upwardly through the sediment trap 22, thence through the valve 19, pipe 24 and into the interior of the receptacle 25. The float 34 will rise and the arm 35 which serves as a pointer will indicate on the scale the amount of gasolene in the receptacle, which amount can be determined by the buyer as well as the seller. The grade of the gasolene can be ascertained by looking at the hydrometer, since the latter moves freely through the arm 35.

When the arm 35 has reached the point 5 on the scale the handle 15 is now swung in the opposite direction until it reaches the stop 54, bringing the valve into the position shown in Fig. 7. Gasolene will now flow out through pipe 24, valve 19, pipe 37, and through the hose 38 into the tank of the vehicle. As soon as five gallons have been delivered the handle is turned to the intermediate position, thus shutting off communication between the various pipes at the valve 19. The customer not only sees the amount actually drawn off, but he sees the condition of the gasolene.

If oil should be wanted then the lever 47 is pulled outwardly and the oil may be measured as it flows from the spout 43, being delivered by the pressure of the air.

When the gasolene is being delivered, it may be that the attendant will seat the lever 15 against the stop 53, thereby permitting the gasolene to enter the receptacle 25 and will forget to shut off the flow. The float will then rise until it reaches the ends of the bell-crank-levers 30, whereupon the movement of the latter will close the valve 29, thus confining the air in the upper end of the receptacle and creating a back pressure which will balance the pressure in the tank and thus prevent the device from overflowing.

In case one should desire to fill his tires with air, connection can be made to the air hose 51 and air used directly from the chamber 3. Obviously any automatic means for starting up the motor might be used or it might be started manually to compress air without departing from the spirit of the invention.

When it is desired to lock the device the end of the hose 38 is placed in its slot 40 and the levers 15 and 47 are placed in their respective slots, the doors are closed and locked, thereby preventing access to the oil or gasolene.

I claim:

1. In a dispensing device, a casing having a recess, a transparent receptacle disposed within the casing, a liquid container communicating with the interior of said receptacle, a valve in the connecting pipe between the container and the receptacle, a lever for operating the valve, said lever being normally disposed in the recess of the casing, and a slidable door carried by the casing for hiding the valve lever and the transparent receptacle and for locking the lever in said recess.

2. A dispensing device comprising a transparent receptacle having a scale therein, a casing for said receptacle having slidable doors, a liquid container, a pipe establishing communication between said liquid container and said receptacle, a three-way valve carried by said pipe, said three-way valve being arranged to establish communication between said container and said receptacle or said receptacle and a discharge pipe, and a lever for operating said three-way valve, said lever being arranged to be locked in position by a door of the casing.

3. In a liquid dispensing device, a pair of liquid containers, a discharge pipe connected with each of said containers, a valve for each discharge pipe, a lever for each valve, a casing having slidable doors and means covered by the slidable doors for retaining the levers in locked position.

4. In a dispensing device a casing, a transparent receptacle disposed within the casing, a liquid container, means for admitting liquid from said liquid container into said receptacle, an air exit pipe disposed centrally in said receptacle, a float guided by said air exit pipe, and a hydrometer disposed in the liquid within said transparent receptacle and loosely held by the float.

5. In a dispensing device a casing, a transparent receptacle disposed within the casing, a liquid container, means for admitting liquid from said liquid container into said receptacle, an air exit pipe disposed centrally in said receptacle, a float guided by said arm exit pipe, a hydrometer disposed in the liquid within said transparent receptacle and loosely held by the float, and means carried at the upper end of said air exit pipe and actuated by the float for closing the air exit pipe.

6. In a dispensing device a casing, a transparent receptacle disposed within the casing, a liquid container, means for admitting liquid from said liquid container into said receptacle, an air exit pipe disposed centrally in said receptacle, a float guided by said air exit pipe, a hydrometer disposed in the liquid within said transparent receptacle and loosely held by the float, means carried at the upper end of said air exit pipe and actuated by the float for closing the air exit pipe, a scale disposed within the transparent receptacle and secured to the wall thereof, and a pointer carried by the hydrometer holding means for indicating the height of the liquid on the scale.

JOHN DEWITT MEREDITH.